United States Patent

Avins et al.

[15] 3,673,499

[45] June 27, 1972

[54] COMBINED TUNING AND SIGNAL STRENGTH INDICATOR CIRCUIT WITH SIGNAL STRENGTH INDICATION DERIVED FROM EACH IF AMPLIFYING STAGE

[72] Inventors: Jack Avins, Princeton; Jack Craft, Somerville, both of N.J.

[73] Assignee: RCA Corporation

[22] Filed: Aug. 26, 1970

[21] Appl. No.: 67,010

[52] U.S. Cl. .............................. 325/398, 325/344, 325/364, 325/455, 334/30

[51] Int. Cl. .............................. H03j 3/12

[58] Field of Search .............................. 325/398, 455, 404, 364; 334/30, 31, 32, 33, 34, 35, 36, 37; 340/248

[56] References Cited

UNITED STATES PATENTS 2,289,840 7/1942 Herz .............................. 325/364

*Primary Examiner*—Robert L. Griffin
*Assistant Examiner*—Donald E. Stout
*Attorney*—Eugene M. Whitacre

[57] ABSTRACT

A tuning and signal strength indicator circuit for FM receivers which enables accurate tuning and signal strength indication on a single indicator for input signal waves ranging from threshold value to receiver overload. Indicator current is obtained by summing contributions from signal waves obtained after the quadrature phase shift network of the detector and several points in the multi-stage amplifier-limiter driving the detector.

11 Claims, 3 Drawing Figures

INVENTORS
Jack Avins and
Jack Craft.
BY Martin Sachs
ATTORNEY

INVENTORS.
Jack Avis and
Jack Craft.
BY Martin Sachs
ATTORNEY

COMBINED TUNING AND SIGNAL STRENGTH INDICATOR CIRCUIT WITH SIGNAL STRENGTH INDICATION DERIVED FROM EACH IF AMPLIFYING STAGE

The present invention relates to tuning and signal strength devices and more particularly to a combined tuning and signal strength circuit for FM receivers suitable for fabrication on a monolithic integrated circuit chip.

The term integrated circuit, as used herein, refers to a unitary or monolithic semiconductor structure or chip incorporating the equivalent of a network of interconnected active and passive electrical circuit elements such as transistors, diodes, resistors, capacitors and the like. The term angle modulation, as used herein, refers to frequency or phase modulated waves or waves modulated in both frequency and phase.

When angle modulation wave transmissions are used for communication purposes, they have the advantage of reducing the reception of man-made and natural noise normally found in the atmosphere. The unwanted noise amplitude modulates the angle modulated signal wave and is removed by the limiting amplifiers in a receiving device in a conventional manner. At the present time, the signal strength indicators associated with angle modulation wave receivers are frequently coupled to a limiting stage. Consequently, when the signal wave becomes of sufficient magnitude to cause substantial limiting, the indicating device does not give an indication of the further increase in the magnitude of the signal wave. When the automatic gain control (AGC) voltage is used for indicating the strength of a signal wave, it is useable over only a small signal range, since the AGC is inactive for weak signal waves.

The tuning indicator conventionally used today is generally a zero center device. Various methods are used to deflect it with a signal obtained from the detector circuit. The zero center device is costly and a second indicator device is required to obtain an indication of signal strength. With the crowded FM broadcast band in use today, it is particularly desirable to have a signal strength indicator circuit and indicating device that is capable of operating over a large range of signal waves with the capability of providing an accurate tuning indication and a continuous indication of signal wave strength on a signal indicator device.

The preferred signal strength indicator circuit and indicating device will operate from relatively low input signal wave levels, in the vicinity of one microvolt, to relatively high input signal wave levels, in the order of several hundred millivolts or more, depending upon the overload characteristics of the preamplifier to tuner.

In the present embodiment of the invention, the intermediate frequency amplifier-limiter stages and the frequency selective phase shift portion of the detector circuit contribute a portion of their signal wave output current to a summing device. The output current appearing in the tuning indicator, therefore, is the sum of the currents contributed by the signal waves of the intermediate frequency amplifying stages and the frequency selective phase shift portion of the detector. This technique provides a continuous indication of the signal wave strength from relatively low signal wave levels to relatively high signal levels and provides a means for accurately tuning a receiving device with a single indicating device regardless of the signal wave strength.

A complete understanding of the present invention may be obtained from the following detailed description when taken in conjunction with the accompanying drawings in which.

Figure 1:
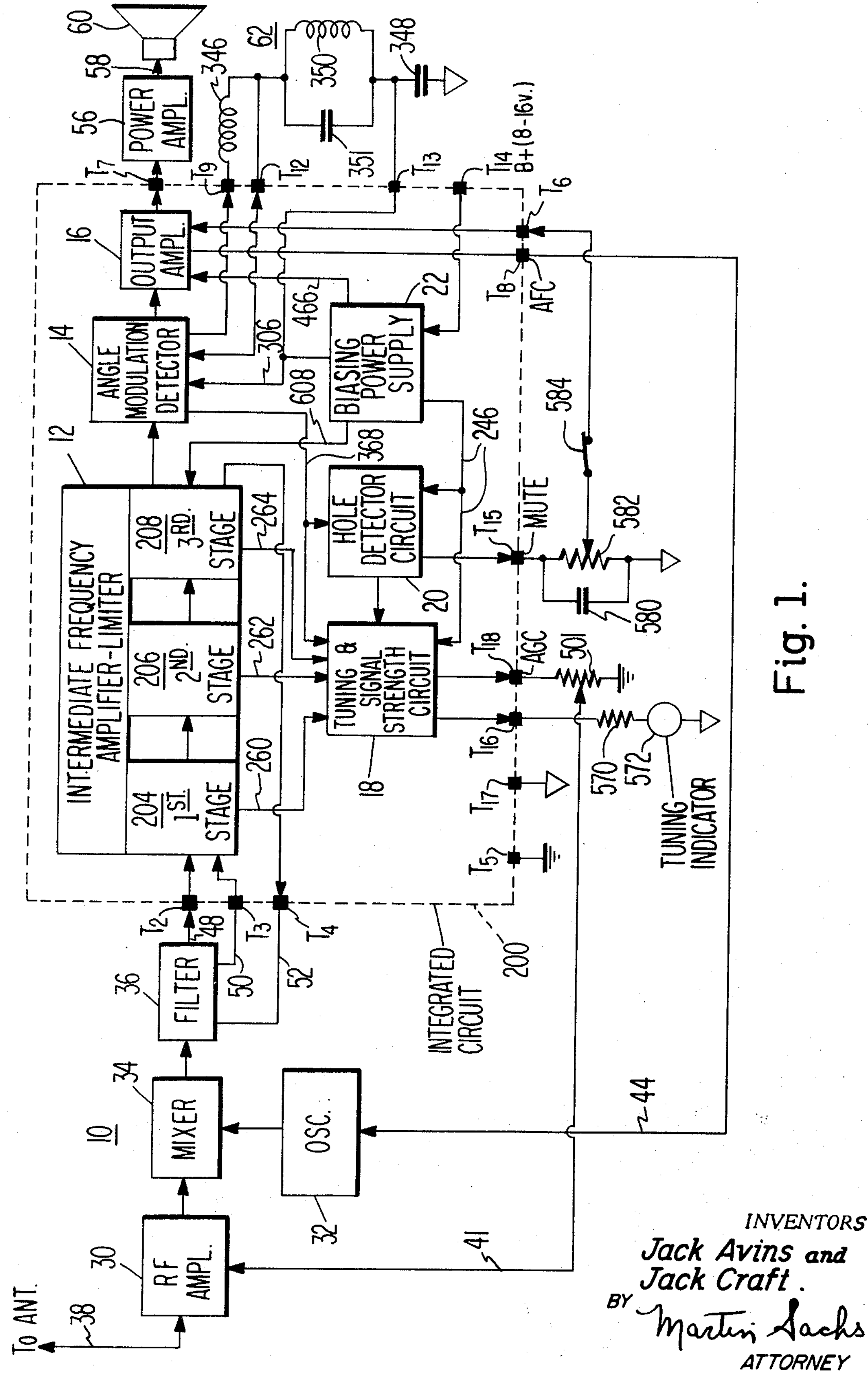
FIG. 1 is a block diagram of an angle modulation receiving system including an indicator circuit embodying the principles of the present invention.

Referring to the drawings, the frequency modulation receiver 10, of FIG. 1, is provided with a tuner having an RF amplifier 30, an oscillator 32, a mixer 34, and a filter 36 which function in the conventional manner. The RF amplifier 30 is connected to an antenna or like signal source through an input signal supply line 38, and has an output connected to the mixer stage 34. The RF amplifier 30 receives an automatic gain control (AGC) voltage, via input conductor 41, from an AGC adjustment potentiometer 501.

The oscillator 32 is also coupled to the mixer stage 34 and is controlled by an automatic frequency control (AFC) current obtained, via conductor 44, from a terminal T8 of an integrated circuit chip 200. The mixer is coupled to the filter 36 which in turn is connected via conductors 48, 50, and 52 to terminals T2, T3, and T4 respectively on the integrated circuit chip 200.

The selectivity of the tuner is obtained by a tuned circuit which is part of the RF amplifier 30 and a tuned circuit which is part of filter 36. The filter provides a balanced push-pull output signal wave which is coupled via connections 48 and 50 to terminals T2 and T3 of the integrated circuit chip 200. The filter 36 also provides a DC path, via connection 52 and terminal T4, for a feedback voltage, which is coupled from the third stage 208 to the first stage 204 of an intermediate frequency (IF) amplifier-limiter 12.

The integrated circuit chip 200 is a major portion of the FM receiver and includes the intermediate frequency (IF) amplifier-limiter 12 having first, second, and third translating stages 204, 206, and 208, an angle modulation detector 14, an output amplifier 16, a tuning and signal strength circuit 18, a signal-to-noise or hole detector circuit 20, and a biasing power supply 22.

The output from the output amplifier 16 is a signal wave coupled to a terminal T7 of the integrated chip 200. This output signal wave is applied to a power amplifier 56 and then, via conductor 58, to a speaker 60. The power amplifier 56 represents a typical utilization means. Various other suitable utilization means may be coupled to terminal T7, since the output signal wave at this point contains the frequency demodulated signal information up to approximately 1 megahertz.

The integrated circuit chip 200 has a plurality of contact areas about its periphery, some of which have already been mentioned, through which external connections to the components appearing on the chip can be made. For example, terminal T17 provides a common or ground potential contact area which is connected to various circuit ground connections on the chip. The triangular shaped symbol at ground terminal T17 is used to designate the output circuitry ground and the conventional ground symbol at terminal T5 is used to designate the input circuitry ground. The input and output circuit grounds (T5 and T17) are two separate areas on the integrated circuit chip and are utilized to reduce common impedances between the input and output signal waves, thereby, reducing interaction and cross coupling between them.

A source of operating potential (B+) between 8 and 16 volts may be coupled to terminal T14 without degrading the performance of the integrated circuit chip. Terminal T18 couples the AGC voltage from the tuning and signal strength circuit 18 to the AGC adjustment potentiometer 501. Terminal T16 couples the tuning and signal strength output current from the tuning and signal strength circuit 18, via a resistor 570, to a tuning indicator 572.

Terminal T15 couples the muting control voltage from the hole detector circuit 20 to an integrating network, comprised of potentiometer 582 and capacitor 580. The muting voltage, which is coupled through a switch 584 and terminal T6 to the output amplifier 16, is capable of controlling the gain of the output amplifier over greater than a 40 dB range. Switch 584 is used to disconnect the muting function when it is not desired.

By way of example, the circuitry incorporated in the output amplifier 16 may be of the type described in a concurrently filed copending application Ser. No. 66,973 of Jack Craft filed Aug. 26, 1970 and assigned to the same assignee as this invention.

Coupled externally to terminals T9, T12, and T13 is a phase shift network 62, comprising inductors 346 and 350, and capacitor 351 which introduces a phase shift for operation of the detector 14. A bypass capacitor 348 removes the noise from the bias voltage appearing at terminal T13.

A signal wave is introduced to the integrated circuit chip at terminals T2 and T3 which couple the signal to the first translating stage 204 of the IF amplifier-limiter 12. The signal wave is then translated through the second and third translating stages 206 and 208 to IF amplifier-limiter 12 which functions to amplify and limit the signal appearing at terminals T2 and T3, and is coupled to the angle modulation detector 14. The limiting action of IF amplifier-limiter 12 removes the amplitude modulation of the FM signal wave envelope. In addition, each translating amplifier stage provides a signal which is coupled, respectively, via conductors 260, 262, and 264 to the tuning and signal strength circuit 18.

By way of example, the circuitry incorporated in the IF amplifier-limiter 12 of the integrated circuit chip 200 may be of the type described in a concurrently filed, copending application Ser. No. 66,921 of Jack Avins filed Aug. 26, 1970 and assigned to the same assignee as this invention.

The signal coupled from the third stage 208 of the IF amplifier-limiter 12 is a push-pull signal and is referred to as the in-phase or reference signal. A quadrature signal is obtained from the reference signal with the aid of the phase shift network 62 and is coupled to the angle modulation detector 14 through the terminal T12.

By way of example, the circuitry incorporated in the angle modulation detector circuit 14 may be of the type described in a concurrently filed, copending application Ser. No. 66,945, of Jack Avins, filed Aug. 26, 1970 and assigned to the same assignee as this invention.

An additional signal, obtained after the phase shift network 62 is coupled from the angle modulation detector 14, via conductor 368, is coupled to the hole detector circuit 20 and to the tuning and signal strength circuit 18. By way of example, the circuitry incorporated in the hole detector circuit 20 may be of the type described in a concurrently filed, copending application Ser. No. 67,009 of Jack Craft filed Aug. 26, 1970, and assigned to the same assignee as this invention.

Operating bias voltages for the circuits on the integrated circuit chip 200 are developed by the biasing power supply 22 from the DC voltage coupled to terminal T14.

Figure 2:
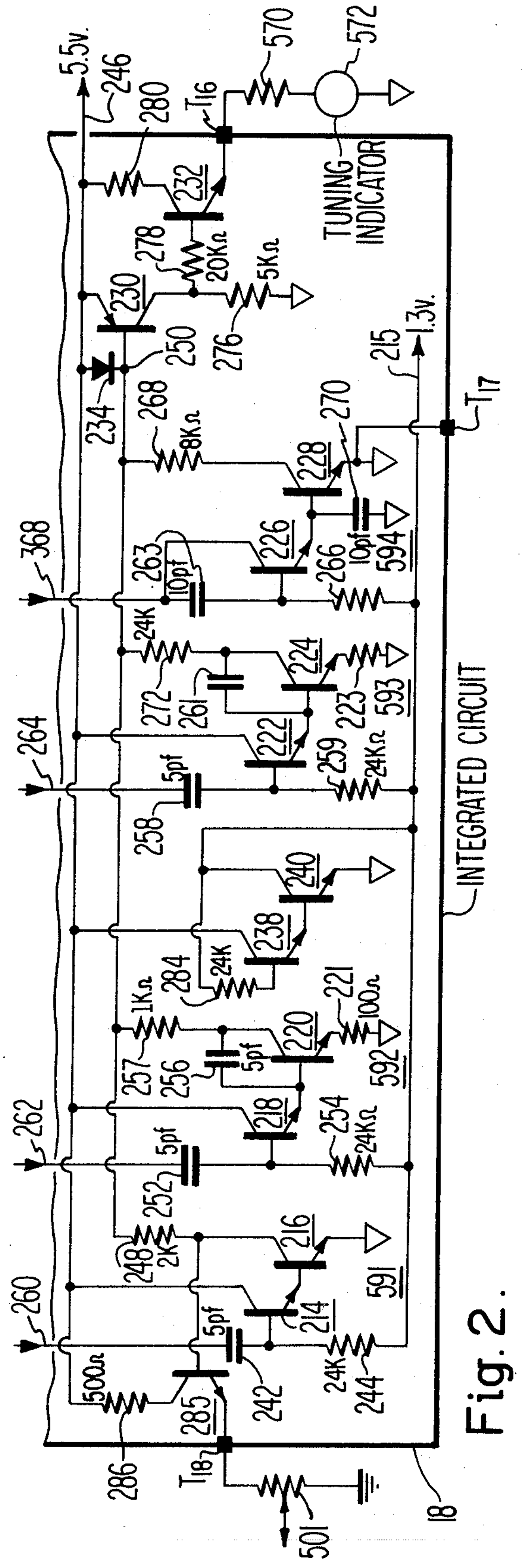
FIG. 2 is a schematic circuit diagram of a combined tuning and signal strength indicator circuit shown in block form in FIG. 1 and incorporated on a portion of a monolithic integrated circuit chip.

FIG. 2 is a schematic circuit diagram of the tuning and signal strength indicator circuit 18 incorporating the principles of the present invention and arranged on the monolithic integrated circuit chip 200. The tuning and signal strength circuit includes four similar peak rectifying circuits 591, 592, 593, and 594. Peak rectifying circuit 591 is comprised of transistors 214, and 216, resistors 244 and 248, and capacitor 242; peak rectifying circuit 592 is comprised of transistors 218 and 220, resistors 221, 257, and 254 and capacitors 252 and 256; peak rectifying circuit 593 is comprised of transistors 222 and 224, resistors 223, 259, and 272, and capacitors 258 and 261; and peak rectifying circuit 594 is comprised of transistors 226 and 228, resistors 266 and 268, capacitors 263 and 270.

A source of DC bias voltage at point 215 of approximately 1.3 volts is the voltage drop from the collector electrode to the emitter electrode of transistor 240. This voltage is used to bias each of the peak rectifying circuits to the threshold of conduction through resistors 244, 254, 259 and 266. The 1.3 volt DC bias is generated by a combination of transistors 238 and 240; and resistor 284. A reference current, flowing via conductor 215 from the biasing power supply 22 through the collector electrode and emitter electrode of transistor 240 to ground T17, causes transistor 240 to assume a voltage drop from its collector electrode to its emitter electrode of a magnitude such that resistor 284 in conjunction with transistor 238 supplies sufficient current to the base electrode of transistor 240 to sustain the reference current supplied at point 215.

An FM wave from the first stage 204 of the intermediate frequency amplifier-limiter 12 is coupled via conductor 260 and capacitor 242 to the base electrode of transistor 214 of the peak rectifying circuit 591. The collector electrode of transistor 216 is coupled by resistor 248 to the common connection 250 of the cathode of a diode 234 and the base electrode of transistor 230.

An FM wave from the second stage 206 of the intermediate frequency amplifier-limiter 12 is coupled via conductor 262 and capacitor 252 to the base electrode of transistor 218 of the peak rectifying circuit 592. The collector electrode of transistor 220 is coupled by resistor 257 to the common connection 250.

A third FM wave from the output of the third stage 208 of the intermediate frequency amplifier-limiter 12 is coupled via conductor 264, and capacitor 258 to the base electrode of transistor 222 of peak rectifying circuit 593. The collector electrode of transistor 224 is coupled by resistor 272 to common connection 250.

A fourth FM wave from the frequency selective phase shift portion of detector 14, prior to demodulation, is coupled via conductor 368 and capacitor 263 to the base electrode of transistor 226 of peak rectifying circuit 594. The collector electrode of transistor 228 is coupled by resistor 268 to common connection 250.

The emitter electrode of transistor 226 is coupled to ground terminal T17 by capacitor 270 which functions as an integrating capacitor. The first three peak rectifying transistors 214, 218, and 222 rely on the distributed capacitance appearing at their respective base and emitter junctions to perform the integrating function. The collector electrode of transistor 230, appearing in the upper right hand corner of FIG. 2, is coupled by resistor 276 to ground and by resistor 278 to the base electrode of transistor 232 which functions as an emitter follower. The collector electrode of transistor 232 is coupled by resistor 280 to conductor 246 and the emitter electrode of transistor 232 is coupled to terminal T16.

The signal waves applied on conductors 260, 262, 264 from the first, second, and third stages of the intermediate frequency amplifier-limiter 12 are insufficient to cause transistors 214, 218, and 222 to conduct at low input signal wave levels. However, the signal waves appearing on conductor 368, having passed through all three stages 204, 206, and 208 of the intermediate frequency amplifier-limiter 12, an additional stage of gain, which is incorporated within the angle modulation detector 14, and the frequency selective phase shift network 62, has sufficient signal wave amplitude to cause transistor 226 to conduct. Using a signal wave which has been coupled through a frequency selective network, permits the tuning circuit to provide gain at the resonant frequency of the network, reducing the effect of nearby signals and noise.

The signal wave voltage appearing at the base electrode of transistor 226 is rectified by the base-emitter junction of transistor 226 and stored by capacitor 270. The DC voltage appearing cross capacitor 270 causes transistor 228 to increase conduction, thereby increasing the current flow in resistor 268, diode 234, and transistor 230. The combination of transistor 230 and diode 234 is another configuration of a current duplicating circuit of the type described in a copending application Ser. No. 866,122 of Steven Steckler filed Oct. 8, 1969 and assigned to the same assignee as this invention wherein diode 234 may be a diode connected transistor.

The current flowing in the collector electrode of transistor 228 is duplicated in the collector electrode of transistor 230. An increase in current in collector electrode of transistor 230 causes the junction of resistors 276 and 278 to become more positive, thereby, turning on transistor 232. This additional current flows through terminal T16, resistor 570 and tuning indicator 204, causing the tuning indicator 572 to deflect.

In a like manner, as the input signal waves increase, the magnitude of the signal waves will increase on conductors 260, 262 and 264. Transistors 214, 218, and 222 will conduct, thereby, causing transistors 216, 220, and 224 to further increase their conduction, increasing the current through diode 234, which will be duplicated in the collector electrode of transistor 230. The collector electrode current of transistor 230, therefore, is the sum of the currents flowing in the collector electrodes of transistors 216, 220, 224, and 228.

At very low signal wave levels, which is the minimum useable signal wave, only the rectifier action of peak rectifying circuit 594, which is driven from the frequency sensitive phase shift network and the additional stage of gain within the angle modulation detector circuit 14, has an output. As the signal wave level increases, the amplifier stage within angle modulation detector 14 limits and the signal wave level on input conductor 368 reaches a maximum value. Accordingly, the output current of transistor 228 reaches a maximum value. At the same time, the signal wave level at the output of the third intermediate frequency amplifier-limiter stage 208, appearing on conductor 264, has been increasing so that the contribution of transistor 224 to the current through diode 234 has also been increasing. Similarly, with further increases in the input signal waves, the signal level at the output of the third amplifier-limiter stage 208 saturates.

Simultaneously, however, the increasing signal wave level at the output of the second amplifier-limiter stage 206, appearing on conductor 262, causes transistor 220 to continue its contribution to the current through diode 234. Again, a further increase in the amplitude of the signal wave causes transistor 220 to saturate, but, transistor 216 still contributes progressively to the current through diode 234. Transistor 216 will eventually saturate at a signal wave level that overloads the associated receiver tuner (front end).

In this manner, a measure of the input signal waves through the first stage is obtained for the full range of input signal waves. Transistor 230, which duplicates the current flowing in diode 234, sums the individual current contributions of each of the peak rectifying circuits 591, 592, 593, and 594 and provides a substantially linear increasing output current signal for a logarithmically increasing signal wave strength.

An increase in signal wave strength on conductor 260 causes an increase in the current flow in the collector electrode of transistor 216 which in turn causes the voltage drop across resistor 248 to increase, thereby, causing the base electrode of transistor 285 to become more negative, resulting in less current flow in the collector electrode of transistor 285. A decreasing current flow in the collector electrode of transistor 285 reduces the voltage drop across potentiometer 501, which is the AGC voltage, and is adapted to decrease the gain of the RF amplifier stage 30.

The disclosed embodiment of the present invention is extremely effective as a tuning meter, since the embodiment disclosed effectively monitors the input signal wave at all signal wave levels and essentially provides a linearly increasing output current signal for a logarithmically increasing signal wave strength. Thus, the normal IF selectively provided by filter 36 (FIG. 1) which precedes the first intermediate frequency amplifier-limiter stage 204, results in a continuous reaction in signal wave level at the input to the first stage as the receiver is tuned off center frequency. This change in signal wave level is accurately displayed on the combination signal strength and tuning indicator 572. The tuning indication is further enhanced by selectivity of the frequency sensitive phase shift network 62.

The circuit, heretofore, disclosed, includes the summing of rectified signal waves contributed at several points in a wide band amplifier-limiter FM detector system which is useable from the lowest signal wave level, where the signal wave tends to be lost in the noise, to the highest signal wave level that a receiver tuner or pre-amplifier can handle without overload. These rectified signals are generated from signal waves obtained from several points, including the frequency selective phase shift network associated with the quadrature detector and at least one other stage in a wide band IF amplifier. In addition, the circuit incorporating the principles of the present invention provides a convenient means of obtaining an AGC voltage for use by either an RF pre-amplifier or a preceding IF amplifier stage.

Figure 3:
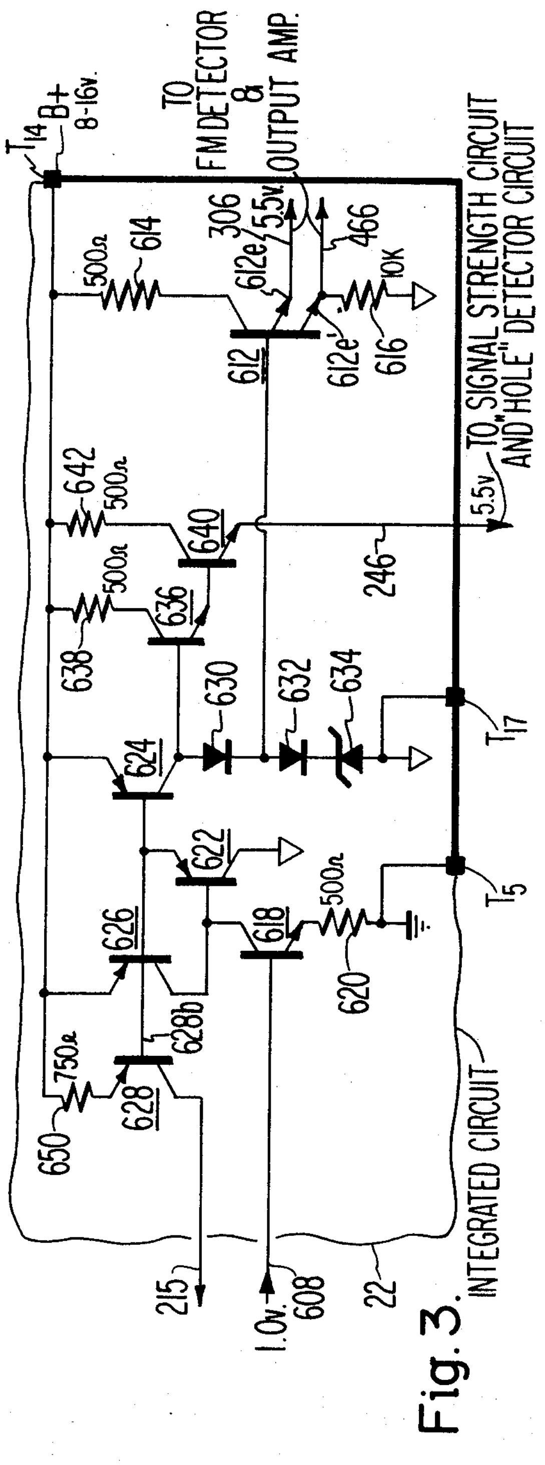
FIG. 3 is a schematic circuit diagram of a biasing power supply incorporated on another portion of the monolithic integrated circuit chip.

Referring now to FIG. 3, another portion of the integrated circuit chip 200 is the biasing power supply 22. The output points 306 and 466 provide a voltage of approximately 5.5 volts relative to ground. As described earlier, point 215 provides a voltage of approximately 1.3 volts relative to ground. Point 608 is connected to the intermediate frequency amplifier-limiter 12 at a point that provides approximately 1.0 volt to the base of transistor 618. Point 246 provides a voltage of approximately 5.5 volts that is utilized by the signal strength circuit 18 and hole detector circuit 20.

Transistor 612 has its collector electrode coupled to B+ terminal T14 through resistor 614 and has a double emitter electrode area 612*e* and 612*e'*. The emitter electrode 612*e* is coupled to point 306; emitter electrode 612*e'* is coupled to point 466 and is coupled to ground T17 through resistor 616.

Transistor 618 has its emitter electrode coupled through resistor 620 to ground (T5). The collector electrode of transistor 618 is coupled to a current duplicating configuration comprised of transistors 622, 624, and 626, thereby, duplicating the current flowing in collector electrode of transistor 618 in the collector electrode of transistors 624 and 626.

The current flowing in the collector electrode of transistor 628 has been referred to as a reference current earlier, and is a lower value than the current flowing in the collector electrode of transistor 624, since it has been reduced by using resistor 650, coupled from emitter electrode of transistor 628 to B+ terminal (T14).

The collector electrode of transistor 624 is coupled by diodes 630, 632, and Zener diode 634 to ground (T17) which functions as the power supply reference voltage. The collector electrode of transistor 624 is also connected to the base electrode of transistor 636 which is coupled to the Darlington connected transistors 636 and 640. The emitter electrode of transistor 640 is coupled to point 246 which provides the output DC voltage of approximately 5.5 volts in the preferred embodiment of the invention.

A substantially fixed voltage at the base electrode of transistor 618 in conjunction with emitter resistor 620 functions as a constant current source. The collector electrode current of transistor 618 is duplicated in the collector electrode of transistor 624 and functions to provide bias current for diodes 630, 632, and 634.

The bias current flowing through Zener diode 634 causes it to develop a voltage offset of approximately 5.5 volts and is used as part of the voltage reference. Diode 632 coupled in series with Zener diode 634 functions to increase the reference voltage. In addition, the diode 632 voltage offset equals the base-emitter electrode voltage offset of transistor 612 which helps maintain the voltage between points 306, 466, and ground approximately constant with temperature and at a value equal to the voltage drop across Zener diode 634. The current through diode 630 causes a voltage offset which is substantially equal to the base-emitter electrode offset voltage of transistor 636. Diode 632 is substantially equal to the base-emitter offset voltage of transistor 640, thereby causing the voltage between point 246 and ground to be equal to the voltage across the Zener diode 634. The output voltages appearing at points 246, 306, and 466 are, therefore, each approximately equal to the voltage drop across Zener diode 634, but are isolated from each other minimizing cross-coupling between the different circuits using these voltages.

As described above, the output voltages appearing at points 246, 306, 466 and the output current appearing at point 215 are independent of the DC input voltage appearing at T14, since all these voltages are obtained with the aid of voltage regulator circuits which are known in the state of the art.

What is claimed is:

1. In a system for receiving radio signals, a combined tuning and signal strength indicator arrangement comprising:

a plurality of cascaded signal amplifying stages;

separate rectifying means coupled to each of said amplifying stages for providing a succession of outputs representative of increasing magnitude of said received signal;

common biasing means for maintaining each of said rectifying means at a conduction threshold in the absence of received signals;

combining means coupled to each of said rectifying means for combining said outputs; and indicating means coupled to said combining means for providing a display indicative of received signal strength.

2. A tuning and signal strength indicator arrangement according to claim 1 wherein:

each said rectifying means comprises a transistor having emitter, base and collector electrodes, each said collector electrode being coupled to a terminal adapted for connection to a source of operating potential; and said biasing means is coupled to the base electrodes of said transistors for biasing said transistors to the threshold of conduction; and said emitter electrodes being coupled to said combining means for providing said outputs.

3. A tuning and signal strength indicator arrangement according to claim 2 wherein said rectifying means further comprises capacitive filtering means coupled to said emitter electrodes.

4. A tuning and signal strength indicator arrangement according to claim 2 further including a capacitor coupled between the emitter electrode of at least one of said transistors and said reference terminal.

5. A tuning and signal strength indicator arrangement according to claim 1 wherein said common biasing means includes stabilizing means for maintaining said rectifying means at said conduction threshold in the presence of operating potential supply variations.

6. A tuning and signal strength indicator arrangement according to claim 5 wherein said stabilizing means provides compensation for temperature variations of components in said circuit.

7. A tuning and signal strength indicator circuit according to claim 6 wherein said combining means comprises a current duplicator circuit, including a diode having an anode and a cathode, and an output transistor having emitter, base, and collector electrodes, the emitter electrode of said output transistor being coupled to said anode, the base electrode of said output transistor being coupled to the cathode of said diode and the collector electrode of said third transistor being coupled to said indicating means.

8. A tuning and signal strength indicator arrangement according to claim 7 wherein at least one of said stages includes a frequency responsive network tuned to a frequency related to received signals; and said indicating means is responsive to variations in the output of said combining means for indicating tuning.

9. A combined tuning and signal strength indicator circuit comprising:

a plurality of signal translating amplifiers having input and output terminals, coupled in cascade, at least one of said signal translating amplifiers including a tuned network;

means providing a source of input signals coupled to the input terminal of the first of said signal translating amplifiers;

rectifying means coupled to the output terminal of each of said signal translating amplifiers for providing a plurality of direct current signals representative of received signal amplitude;

common biasing means for maintaining each of said rectifying means at a conductive threshold in the absence of received signals;

summing means coupled to each said rectifying means for summing said direct current signals; and indicating means coupled to said summing means for providing a display indicative of tuning and received signal strength.

10. A combined tuning and signal strength indicator circuit according to claim 9 wherein:

each said rectifying means comprises a first transistor, having emitter, base, and collector electrodes, each said collector electrode being coupled to a terminal adapted for connection to a source of operating potential; and said biasing means is coupled to the base electrodes of said transistors for biasing said transistors to the threshold of conduction; and each said rectifying means further comprises a second transistor, having base, emitter, and collector electrodes, each of said last-named collector electrodes being coupled through said summing means to said operating potential terminal, each said last-named base electrode being coupled to the emitter electrode of a corresponding one of said first transistors, and the emitter electrode of each said transistor being coupled to a reference terminal.

11. A combined tuning and signal strength indicator circuit according to claim 10 wherein said summing means comprises a current duplicator circuit, including a diode having an anode and a cathode, said anode being coupled to said operating potential terminal, a third transistor having emitter, base, and collector electrodes, the emitter electrode of said third transistor being coupled to said operating potential terminal, the base electrode of said third transistor being coupled to the cathode of said diode and the collector electrode of said second transistors, the collector electrode of said third transistor being coupled to said indicating means.

* * * * *